(12) United States Patent
Hsia

(10) Patent No.: US 9,980,340 B2
(45) Date of Patent: May 22, 2018

(54) LINEAR SOLID-STATE LIGHTING WITH ELECTRIC ARC DETECTION AND PREVENTION FREE OF FIRE HAZARD

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days. days.

(21) Appl. No.: 15/666,495

(22) Filed: Aug. 1, 2017

(65) Prior Publication Data
US 2017/0359881 A1    Dec. 14, 2017

Related U.S. Application Data

(63) Continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015,
(Continued)

(51) Int. Cl.
| | |
|---|---|
| *H05B 33/08* | (2006.01) |
| *F21V 25/12* | (2006.01) |
| *F21K 9/278* | (2016.01) |
| *F21K 9/275* | (2016.01) |
| *F21Y 115/10* | (2016.01) |
| *F21Y 103/10* | (2016.01) |
| *F21V 23/06* | (2006.01) |

(52) U.S. Cl.
CPC ......... *H05B 33/0887* (2013.01); *F21V 25/12* (2013.01); *H05B 33/0809* (2013.01); *F21K 9/275* (2016.08); *F21K 9/278* (2016.08); *F21V 23/06* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 8,749,167 B2* | 6/2014 | Hsia | ........................ F21V 25/00 315/209 R |
| 9,480,123 B2* | 10/2016 | Van Dijk | ........... H05B 33/0884 |

(Continued)

*Primary Examiner* — Minh D A
*Assistant Examiner* — James H Cho
(74) *Attorney, Agent, or Firm* — Han IP Corporation; Andy M. Han

(57) ABSTRACT

A linear light-emitting diode (LED)-based solid-state lamp comprises an LED driving circuit, LED arrays, a rectifier configured to convert an input AC voltage into a DC voltage, and an electric arc detection and current control module. The electric arc detection and current control module comprises a first derivative circuit configured to detect voltage variations from the DC voltage provided by the rectifier. The DC voltage varies drastically when an electric arc occurs while maintaining intact when the input AC voltage is not affected by the electric arc. The first derivative circuit takes a first-derivative of the voltage variations, coupling to a comparator circuit to determine if the electric arc occurs. When the electric arc is detected, the electric arc detection and current control module shuts off a current return from the LED arrays to reach the rectifier, hence preventing the electric arc from occurring during relamping or operating.

14 Claims, 4 Drawing Sheets

Related U.S. Application Data now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2011/0260622 A1* | 10/2011 | Hartikka | F21V 25/04 |
| | | | 315/113 |
| 2012/0181952 A1* | 7/2012 | Roeer | H05B 33/0809 |
| | | | 315/307 |
| 2012/0300445 A1* | 11/2012 | Chu | F21V 25/04 |
| | | | 362/217.13 |

* cited by examiner

LINEAR SOLID-STATE LIGHTING WITH ELECTRIC ARC DETECTION AND PREVENTION FREE OF FIRE HAZARD

CROSS-REFERENCE TO RELATED APPLICATIONS

This application is a continuation-in-part (CIP) application of U.S. patent application Ser. No. 15/225,748, filed Aug. 1, 2016 and issued as U.S. Pat. No. 9,743,484 on 22 Aug. 2017, which is a CIP application of U.S. patent application Ser. No. 14/818,041, filed Aug. 4, 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to linear light-emitting diode (LED) lamps that operate with linear tube lamp fixtures configured to electrically connect to either an electronic ballast or AC mains, and more particularly to a universal fire hazard-free linear LED tube lamp with electric arc detection and prevention.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operable LED lamp by removing/bypassing the ballast. Either application has its advantages and disadvantages. In the former case, although the ballast consumes extra power, it is straightforward to replace the fluorescent tube without rewiring, which consumers may have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumers will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT lamps becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effective solution by using a universal LLT lamp that can be used with the AC mains and is compatible with an electronic ballast so that LLT lamp users can save an initial cost by changeover to such a universal LLT lamp followed by retrofitting the lamp fixture to be used with the AC mains when the ballast dies.

Electronic ballasts have several different types. However in the US, instant-start electronic ballasts are most popular in lamp fixtures because they are more efficient and less expensive than other types of electronic ballasts and have fewer wires for installation. Nevertheless, it is better for the ballast-compatible LLT lamp to be compatible with either instant-start or rapid-start electronic ballasts. In the context hereafter, the instant-start electronic ballast will be referred to when a ballast is mentioned unless a rapid-start electronic ballast is explicitly stated.

In the U.S. patent application Ser. No. 14/688,841, filed Apr. 16, 2015, two shock prevention switches and an all-in-one driving circuit are adopted in an LLT lamp such that AC power from either an electronic ballast or the AC mains can operate the lamp without operational uncertainty and electric shock hazards. In other words, no matter what a lamp fixture is configured as the AC mains or an electronic ballast compatible fashion, the LLT lamp automatically detects configurations and works for either one. All of such LLT lamps, no matter whether AC mains-operable or ballast compatible, are electrically wired as double-ended and have one construction issue related to product safety and needed to be resolved prior to wide field deployment. This kind of LLT lamps always fails a safety test, which measures through lamp leakage current. Because an AC-mains voltage applies to both opposite ends of the tube when connected to a power source, the measurement of current leakage from one end to the other consistently results in a substantial current flow, which may present a risk of an electric shock during re-lamping. Due to this potential shock risk to the person who replaces the LLT lamps in an existing fluorescent tube fixture, Underwriters Laboratories (UL) uses its standard, UL 935, Risk of Shock During Relamping (Through Lamp), to do a current leakage test and to determine if the LLT lamps meet the consumer safety requirement. Although the LLT lamps used with an electronic ballast can pass the current leakage test, some kinds of electric shock hazards do exist. Experimental results show that the skin of the person who touches an exposed bi-pin may be burned due to such an electric shock. Fortunately, a mechanism of double shock prevention switches used in applications with the AC mains is also effective in applications with the ballasts to prevent the electric shock from occurring, thus protecting consumers from such a hazard, no matter whether input voltage is from the AC mains or the electronic ballast. Therefore, a universal LLT lamp that can work with either the AC mains or the electronic ballast makes sense. The effectiveness of using double shock prevention switches for applications in the AC mains has been well addressed in U.S. Pat. No. 8,147,091, issued on Apr. 3, 2012. However, a conventional shock prevention switch has an inherent issue related to an electric arc when operated with an electronic ballast. Unlike an AC voltage of 120 or 277 V/50-60 Hz from the AC mains, the output AC voltage and current from the electronic ballast presents a negative resistance characteristic. The feature that originally supports a fluorescent tube to function properly becomes extremely detrimental to the conventional shock prevention switch due to the electric arc likely occurring between two electrical contacts that have a high electrical potential difference with a high frequency, such as 600 V/50 kHz. Once a consumer fails to follow installation instructions to install or uninstall linear LED tube lamps such that one of two ends of the tube lamp is in the fixture socket connected to a powered electronic ballast, and the other end is tweaked to connect to or disconnect from the associated socket, an internal arcing may occur between the electrical contacts in the associated switch. The arcing even in a short period such as several seconds can generate high heat, burning and melting electrical contacts and neighboring plastic enclosures, creating a fire hazard. The line voltage of 120 or 277 V/50-60 Hz from the AC mains does not have such an issue because its voltage is relatively low compared with the ballast output voltage of 600 V. Moreover, the AC frequency of 60 Hz automatically extinguishes an arc every $\frac{1}{60}$ seconds, if existed. That is why a utility switch can be used in an electrical appliance to turn power on and off without any problem. However when used with the electronic ballast, the electrical contacts used in the conventional shock prevention switch can easily be burned out due to the high-voltage and high-frequency arcing introduced between each gap of each pair of the electrical contacts in the conventional shock prevention switch when someone tries to abusively tweak to remove the tube lamp from the fixture with the ballast that has a power on it. Although such a situation is rare, an internal arcing, if occurred, does cause burning and even welding of the electrical contacts and melting of the plastic enclosure, so called internal fire, creating consumer safety issues.

Furthermore, when the LLT lamp is installed in an old fluorescent tube fixture, the two bi-pins at the two opposite ends of the LLT lamp are mounted on the two sockets on the fluorescent tube fixture, assuming that good electrical connections are made. When copper contacts of the sockets on the old fluorescent tube fixture become worn out over time, the electrical connections between the bi-pins and the socket copper contacts may be poor. When an installation is made as the worn socket copper contacts are energized, an electric arc will unavoidably occur between the bi-pins and the socket copper contacts. Like the internal arcing between the electrical contacts in the shock prevention switch, the electric arc between the bi-pins and the socket copper contacts, even a short period of time such as a few seconds, may generate high heat conducting through the bi-pins to burn and melt the plastics used to fix the bi-pins on the end caps of the LLT lamps, creating a fire hazard.

In U.S. patent application Ser. No. 15/225,748, filed Aug. 1, 2016, a thermal protection mechanism such as use of at least one thermal protection device was proposed as a last resort to eliminate the fire hazard in the LLT lamps operating with the electronic ballast or the AC mains. The at least one thermal protection device used in front of the first electrical contact of the at least two electrical contacts in the shock prevention switch is configured to cut off electric current when a predetermined cut-off temperature is reached. The use of the at least one thermal protection device ensures that an electric arc, if existed, will not continue over several seconds between the socket copper contacts on the external linear tube lamp fixture and the bi-pin and between the at least two electrical contacts in the shock prevention switch. However, the at least one thermal protection device will burn out and permanently disconnect electrical connections near the at least one thermal protection device when the predetermined cut-off temperature is reached. As a result, the LLT lamp with the at least one thermal protection device burning out becomes scraps and can no longer be used. Nevertheless, consumers demand an LLT lamp with a recoverable capability. It is therefore the purpose of the present disclosure to disclose an electric arc detection and prevention mechanism in the LLT lamp to eliminate the electric arc from occurring. The LLT lamps with the recoverable capability remain usable in a normal mode after the electric arc is prevented from occurring.

SUMMARY

A linear LED tube (LLT) lamp comprising a housing having two ends each with a lamp base; at least one rectifier; LED arrays; an LED driving circuit connected to the LED arrays; an electric arc detection and current control module; and two input modules associated with the two ends, each comprising a shock prevention switch, is used to replace a fluorescent tube in a retrofit or newly-made linear tube lamp fixture that could have an existing electronic ballast or simply an AC mains-ready configuration. When such an LLT lamp is installed in or uninstalled from the energized lamp fixture, the electric arc detection and current control module can detect and prevent an electric arc from occurring, eliminating possible internal and external fire hazards while maintaining electric shock free for consumers.

In one embodiment, the electric arc detection and current control module works with a dual-mode LED driving circuit that can operate with the AC mains and electronic ballasts to shut off a current return from the LED driving circuit and the LED arrays when the electric arc is detected. In this scheme, the shock prevention switch of each of the lamp bases comprises at least one set of electrical contacts and a switch actuation mechanism to prevent an electric shock from occurring. The at least one set of electrical contacts comprises at least two electrical contacts, with one electrically connected to the at least one electrical conductor in a bi-pin of a lamp base and another coupled to the LED driving circuit. The switch actuation mechanism comprises at least one front control portion protruding outwards. When the at least one front control portion of the switch actuation mechanism is pressed in or twisted on as the bi-pin of the lamp base is installed in a lamp socket, the at least two electrical contacts of the at least one set of electrical contacts are electrically connected to actuate the shock prevention switch. If an electric arc occurs, no matter whether it does externally between the bi-pins and the sockets, or internally between the at least two electrical contacts in the at least one set of electrical contacts in the shock prevention switch, the electric arc detection and current control module can detect such an electric arc and shut off a current return from the LED driving circuit and the LED arrays to reach the at least one rectifier immediately before the high heat generated by the electric arc further damages the plastic enclosure, creating a fire.

Furthermore, electronic ballasts always have an inductive circuit at their output which connects to the LLT lamps. When the inductive circuit is switched off, the current cannot instantaneously jump to zero. A transient arc will be formed across any separating contacts in the LLT lamps, including ones in the shock prevention switches. Since the LED driving circuit has a substantial current return from the LED arrays, if not cut off, and a high ballast output voltage to sustain the arc possibly formed between any gaps inside the LLT lamps, the arc over time can gradually cause damage to the electrical contacts especially in the shock prevention switches such as melting of conductors in the shock prevention switches and destruction of insulation, eventually resulting in a fire. The electric arc detection and current control module can also detect such a transient arc and shut off the current return from the LED driving circuit and the LED arrays, thus immediately extinguishing the arc.

In another embodiment, the electric arc detection and current control module works with a ballast-compatible LED driving circuit to shut off a current return from the LED driving circuit and the LED arrays to reach the at least one rectifier when the electric arc is detected. In this scheme, no electric shock prevention switch is necessary. The electric arc detection and current control module detects if an electric arc occurs externally between the bi-pins and the sockets and shuts off a current return from the LED driving circuit and the LED arrays to reach the at least one rectifier immediately before the high heat generated by the electric arc further damages the plastic enclosure in the lamp bases, creating a fire.

The electric arc detection and current control module comprises a first derivative circuit, a comparator circuit, a switch control device, and at least one switch controlled by the switch control device to connect or disconnect the electric current return from the LED driving circuit and the LED arrays. Whereas the at least one switch is connected between the LED driving circuit and the at least one rectifier, the first derivative circuit receives a voltage signal from the at least one rectifier. When the voltage signal from the at least one rectifier is received, the first derivative circuit takes first derivative of the voltage signal, that is, an instantaneous rate of the change of the voltage signal from the at least one rectifier. Whereas the voltage signal has relatively small variations in normal mode, the voltage signal has relatively large variations when the electric arc occurs. The first derivative of the voltage signal between the two cases differs significantly. Therefore, the comparator circuit following the first derivative circuit can be used to determine if the electric arc occurs.

The electric arc detection and current control module controls the at least one switch to connect or disconnect the electric current flow, hence turning on or off the power delivering to the LED arrays. That is, when no electric arc is detected, the electric arc detection and current control module controls the at least one switch to continue "on", thus the electric current being able to continue to flow out from the LED driving circuit and the LED arrays. When the electric arc is detected, the electric arc detection and current control module controls the at least one switch to turn "off", thus disconnecting the electric current from flowing out of the LED driving circuit and the LED arrays and simultaneously extinguishing the electric arc. The scheme can not only effectively terminate an electric arc during relamping but also reduce a risk of fire hazard during operation.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
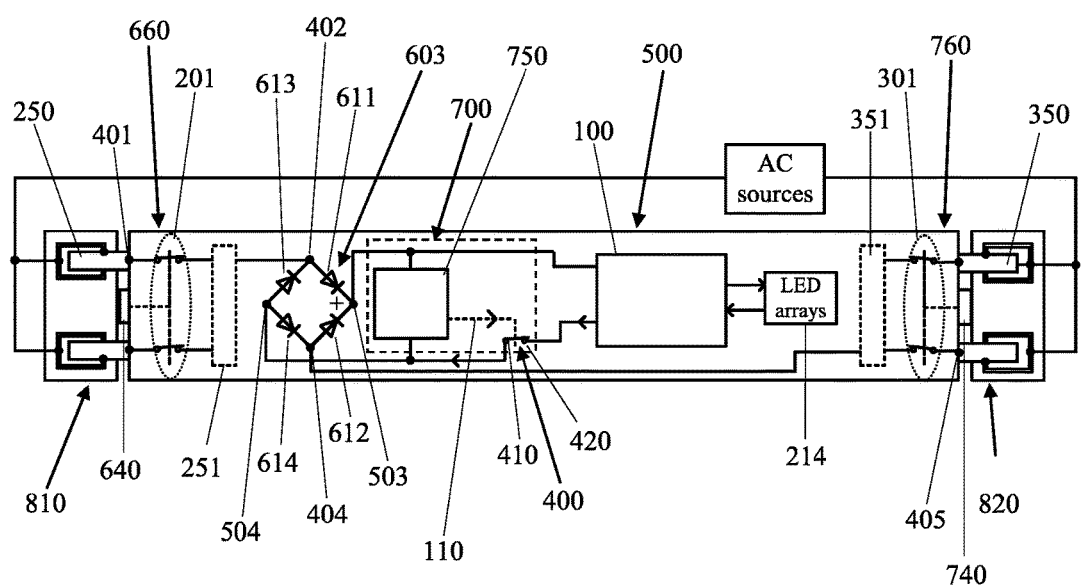
FIG. 1 is a block diagram of an LLT lamp with a dual-mode LED driving circuit, installed in lamp fixture sockets connected with either AC mains or a ballast according to the present disclosure.

FIG. 1 is a block diagram of an LLT lamp with a dual-mode LED driving circuit, installed in lamp fixture sockets connected with either AC mains or an electronic ballast according to the present disclosure. The LLT lamp 500 comprises a housing having two ends; two lamp bases 660 and 760 each having at least one electrical conductor 250 and 350 at each end of the housing; an electric arc detection and current control module 700; at least one rectifier 603 comprising diodes 611, 612, 613, and 614 interconnected at ports 402, 404, 503, and 504; a dual-mode LED driving circuit 100 having a first and a second input ports 503 and 420; and LED arrays 214 disposed between the two ends of the housing with the LED arrays 214 connected to the dual-mode LED driving circuit 100. The electric arc detection and current control module 700 comprises an electric arc detection module 750 and at least one switch 400 comprising a pair of electrical contacts 410 and 420 controlled by the electric arc detection module 750. The LLT lamp 500 may further comprise interface modules 251 and 351 respectively for two lamp bases 660 and 760, configured to work with an electronic ballast for maximum compatibility. Each of the interface modules 251 and 351 may comprise a resistor, a resistor in parallel with capacitor, one or more inductors, a jumper, or a combination thereof, or simply a passing-through connection such as a direct connection between a connection point 401 and the interconnection port 402 for the interface module 251 and a direct connection between a connection point 405 and the interconnection port 404 for the interface module 351. In the context followed, such direct connections will be used for simplicity unless otherwise specified. Please note that neither of the interface modules 251 and 351 includes a fuse or any EMI (electro-magnetic interference) filters. The LLT lamp 500 may further comprise shock prevention switches 201 and 301 respectively connected with the interface modules 251 and 351. The shock prevention switches 201 and 301 comprise two actuation mechanisms 640 and 740 respectively in the two lamp bases 660 and 760. Each of the interface module 251 and 351 has three ports, in which the first and the second ports connect to the two pins of the respective bi-pins 250 and 350 through the shock prevention switches 610 and 710 and the third port connects to the input/output ports 402 and 404. The dual-mode LED driving circuit 100 thus can receive power from the bi-pins 250 and 350 connected to the AC mains or the electronic ballast in a double-ended wiring lamp fixture to power the LED arrays 214. As can be seen in FIG. 1, the interface modules 251 and 351 do not have effect in the double-ended AC mains operation because each of external fixture lamp sockets 810 and 820 are shunted. In fact, the interface modules 251 and 351 are used to match an output circuit of a rapid-start electronic ballast so that the rapid-start electronic ballast can be used with the LLT lamp. This will be further explained in FIG. 2.

When the LLT lamp 500 is inserted into fixture sockets connected with an electronic ballast, an electric arc may occur during installation when a power is not "off". The electric arc may damage components in the electronic ballast causing the electric current to substantially increase to flow into the LLT lamp 500. The over-rated current results in overheating on both the electronic ballast and the LLT lamp 500, eventually causing a failure or a fire hazard. Several recent product recalls in the lighting industry involve such a hazard. Furthermore, output circuit of the electronic ballast and the dual-mode LED driving circuit 100 are inductive. The current cannot instantaneously jump to zero in such inductive circuit when both the circuits switched off. Instead, a transient arc may be formed across any separating contacts in the LLT 500, including the electrical contacts in the shock-prevention switches 201 and 301. Although snubher circuits can supply a path for transient currents preventing arcing, they become damaged after repeated arcing energy absorptions if the dual-mode LED driving circuit 100 has enough current and voltage to sustain the arc each time arcing occurs. Moreover, the electrical contacts in the shock-prevention switches 201 and 301 may be deteriorated over time when a contact resistance becomes larger due to repeated arch electrical contacts. In this case, a risk of burning and firing increases. The problem can be solved by fundamentally cutting off the current flow once the electric arc occurs. In FIG. 1, the electric arc detection and current control module 700 is connected in parallel with the at least one rectifier 603 in a way that V+ at the port 503 and V− at the port 504 from the at least one rectifier 603 connects to two input/output ports of the electric arc detection and current control module 700. The dual-mode LED driving circuit 100 also connects to V+ at the port 503 and V− via the at least one switch 400 in a way that when the at least one switch 400 is "on", the second input port 420 of the dual-mode LED driving circuit 100 connects to V− at the port 504 of the at least one rectifier 603. Thus, when the at least one switch 400 is "on", the dual-mode LED driving circuit 100 can receive power from the at least one rectifier 603.

The electric arc detection and current control module 700 receives a voltage signal from V+ relative to V−, analyzes the voltage signal, and determines if an electric arc occurs, no matter whether it does externally between the bi-pins 250, 350 and the sockets 810, 820; or internally between the at least two electrical contacts in the at least one set of electrical contacts in the shock-prevention switches 201 and 301. When the electric arc is detected, the electric arc detection module 750 turns off an electrical connection between the electrical contacts 410 and 420 of the at least one switch 400 through the control link 110, shutting off a current return from the dual-mode LED driving circuit 100 and the LED arrays 214 to reach the at least one rectifier 603 immediately before the high heat generated by the electric arc further damages the relative electrical contacts. Thus, the electric arc current is blocked, no substantial leakage current possibly flowing out to sustain electric arc. As can be seen in FIG. 1, two sockets in each of the external fixture lamp sockets 810 and 820 are shunted, meaning that as long as both the at least one electrical conductor 250 in the lamp base 660 and the at least one electrical conductor 350 in the lamp base 760 connect to the AC power sources, the LLT lamp 500 can get a power to operate.

Figure 2:
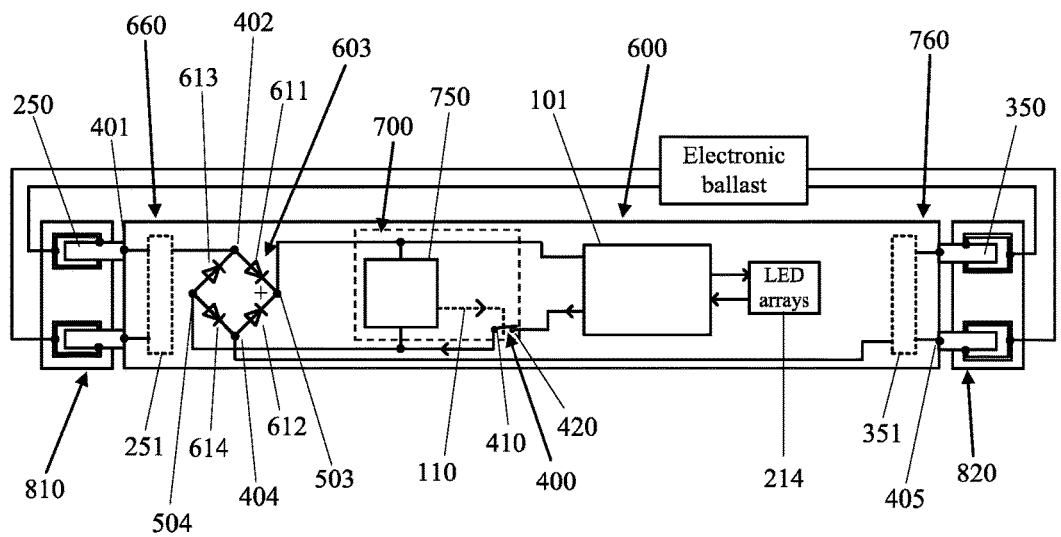
FIG. 2 is a block diagram of an LLT lamp with a ballast-compatible driving circuit, installed in lamp fixture sockets connected with a rapid-start electronic ballast according to the present disclosure.

FIG. 2 is a block diagram of an LLT lamp with a ballast-compatible LED driving circuit, installed in lamp fixture sockets connected with a rapid-start electronic ballast according to the present disclosure. FIG. 2 is almost the same as FIG. 1, except that the rapid-start electronic ballast rather than the AC mains is used to power the LLT lamp 600, that a ballast-compatible LED driving circuit 101 rather than the dual-mode driving circuit 100 is used, and that no shock prevention switches are used. The rapid-start electronic ballast has four output wires with two wires connected to the fixture lamp socket 810 and another two connected to the fixture lamp socket 820. In the LLT lamp 600, the two interface module 251 and 351 are configured to couple across the bi-pins 250 and 350, to match up an output circuit of the rapid-start electronic ballast to maximize compatibility. However, not like the filament in the fluorescent lamp in which a low resistance such as 10 ohms is used, each of the interface modules 251 and 351 may comprise a resistor, a resistor in parallel with capacitor, one or more inductors, a jumper, or a combination thereof, or simply a passing-through connection such as a direct connection between a connection point 401 and the interconnection port 402 for the interface module 251 and a direct connection between a connection point 405 and the interconnection port 404 for the interface module 351. When the LLT lamp 600 is inserted into fixture sockets connected with an electronic ballast, an electric arc may occur during installation when a power is not "off". Due to ballast incompatibility with the LLT lamp 600 that does not have compatible interface modules to match output circuit of the ballast, the electric arc may damage components in the electronic ballast causing the electric current to substantially increase to flow into the LLT lamp 600. The over-rated current results in overheating on both the electronic ballast and the LLT lamp 600, eventually causing a failure or a fire hazard. Not surprisingly, several recent product recalls in the lighting industry involve such a hazard.

As in FIG. 1, the electric arc detection and current control module 700 receives a voltage signal from V+ relative to V−, analyzes the voltage signal, and determines if an electric arc occurs, no matter whether it does externally between the bi-pins 250, 350 and the sockets 810, 820; or internally between any possible gaps in electrical contacts in the LLT lamp 600. When the electric arc is detected, the electric arc detection module 750 turns off an electrical connection between the electrical contacts 410 and 420 of the at least one switch 400 through the control link 110, shutting off a current return from the ballast-compatible LED driving circuit 101 and the LED arrays 214 to reach the at least one rectifier 603 immediately before the high heat generated by the electric arc further damages the relative electrical contacts including the bi-pins 250 and 350 and the sockets 810 and 820. Thus, the electric arc current is blocked, no substantial leakage current possibly flowing out to sustain electric arc. The electric arc detection and current control module 700 works equally well with an electronic ballast-compatible LED driving circuit 101 to shut off a current return from the LED arrays 214 to reach the at least one rectifier 613 when the electric arc is detected.

In general, the installer will not turn off the power before installing or replacing the LLT lamp, although an installation instruction of the LLT lamp always instructs to turn off the power before installation. This is especially true in office area, where a lot of the LLT lamps are going to be replaced and when a manager considers that an office without a light dramatically affects productivity. After the installer installs the LLT lamp 500 or 600 in the fixture lamp sockets 810 and 820 wired as an electronic ballast-compatible configuration with a power on, she or he needs to rotate the tube lamp 90 degrees to light it up because the copper contacts in the fixture lamp sockets 810 and 820 (sockets copper contacts, hereafter) are not yet in contact with the bi-pins 250 and 350 of the universal LLT lamp 800 until the 90-degree rotation is made. In most cases, the universal LLT lamp lights up immediately and normally. In some cases, the universal LLT lamp lights up immediately but exhibits buzzing operation, a phenomenon of an electric arc occurring between the socket copper contacts and the bi-pins 250 and 350. The electric arc has a non-linear relationship between current and voltage. Once the electric arc is established when any pin of the bi-pins 250 and 350 momentarily touch the socket copper contacts, then separate clue to a worn copper contact, an increased current results in a lower voltage between the arc terminals—a negative resistance effect. Unfortunately, the electronic ballast provides an impedance to maintain a stable arc. This property is the reason why uncontrolled electric arcs in a conventional LED tube lamp become so destructive, since once initiated, the arcs will draw more and more current and power from the ballast, generating high heat until the lamp base of the conventional LED tube lamp is destroyed, creating a fire hazard.

Figure 3:
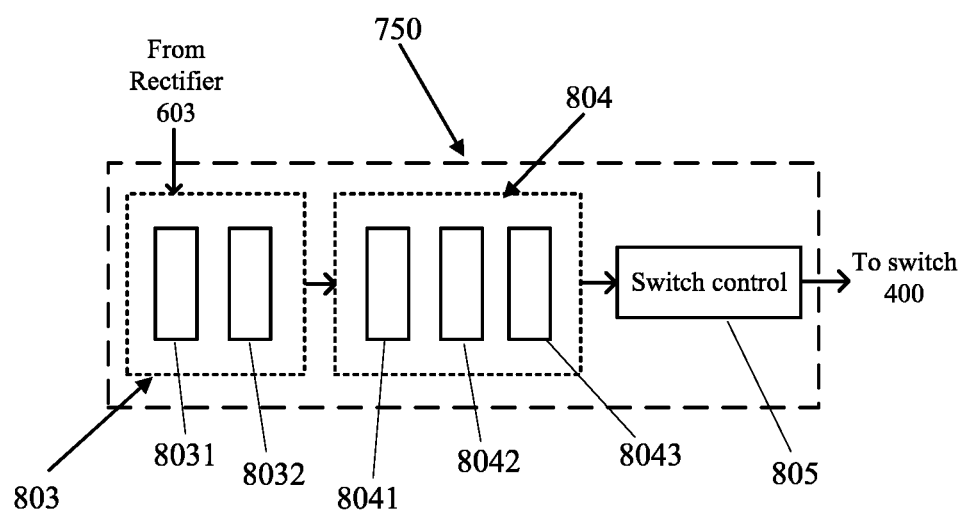
FIG. 3 is an embodiment of an electric arc detection module in an LLT lamp according to the present disclosure.

FIG. 3 is an embodiment of an electric arc detection module in an LLT lamp according to the present disclosure. The electric arc detection module 750 comprises a first derivative circuit 803, a comparator circuit 804, and a switch control device 805 configured to control the at least one switch 400 to connect or disconnect the electric current return from the dual-mode LED driving circuit 100 or ballast-compatible LED driving circuit 101 and the LED arrays 214. The first derivative circuit 803 receives a voltage signal from the at least one rectifier 603 and takes the first derivative of the voltage signal, which shows instantaneous rate of the change of the voltage signal from the at least one rectifier 603. Whereas the voltage signal has relatively small variations in normal mode, the voltage signal has relatively large variations when the electric arc occurs. The first derivative of the voltage signal can distinguish differences between these two cases. In either case, the comparator circuit 804 following the first derivative circuit 803 converts the small or large variations further processed by the first derivative circuit 803 into bilevel signals which are used to determine if the electric arc occurs. The first derivative circuit 803 may comprise a first filter 8031 configured to reduce ripples of the rectified DC voltage from the at least one rectifier 603 and a differentiator 8032 configured to pick up the rapidly varying voltage signals which may be associated with electric arc. The comparator circuit 804 may comprise a diode circuit 8041 configured to convert the first derivative of the voltage signal into a direct current (DC) detection signal, a second filter 8042 configured to average out the DC detection signal, and a comparator 8043. The comparator 8043 receives an analog signal from the second filter 8042, compares the analog signal with a reference voltage that is preset as an optimum threshold to minimize an error probability of the electric arc detection, and converts the analog voltage signal into a bilevel signal to send to the switch control device 805, subsequently controlling the at least one switch 400 to switch "on" when an electric arc is not detected or to switch "off" when an electric arc is detected.

Figure 4:
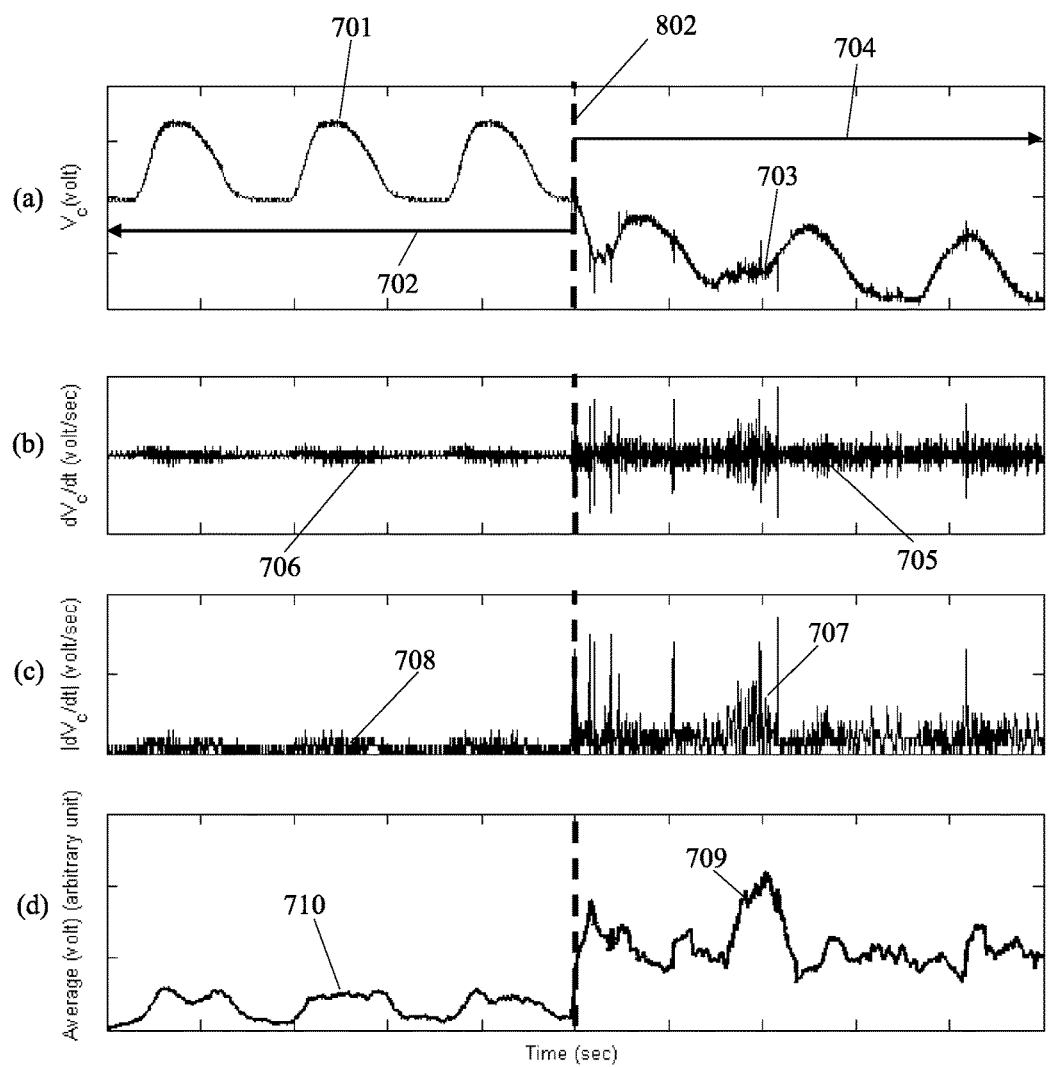
FIG. 4 is a series of waveforms measured in an electric arc detection module according to the present disclosure.

FIG. 4 is a series of waveforms measured in an electric arc detection module according to the present disclosure. In FIG. 4 (a), the waveform is a voltage signal $V_c$, taken between the first filter 8031 and the differentiator 8032. A dash line 802 represents a time point that an electric arc starts. It can be seen that the voltage signal coupled from the at least one rectifier 603 shows small variations 701 on the left side 702 of the dash line 802 but large variations 703 on the right side 704 of the dash line 802. A voltage drop can also be seen when the electric arc starts. In FIG. 4 (b), the waveform is a first derivative $dV_c/dt$ of the voltage signal $V_c$, taken between the differentiator 8032 and the comparator circuit 804. It is apparent that the first derivative $dV_c/dt$ of the voltage signal $V_c$ shows larger variations 705 when the electric arc occurs than variations 706 before the electric arc occurs. The differentiator 8032 effectively removes low-frequency components such that the voltage drop due to the electric arc disappears on the right side 704 of the dash line 802. In FIG. 4 (c), the waveform is an absolute value of the first derivative $dV_c/dt$ of the voltage signal $V_c$, taken between the diode circuit 8041 and the second filter 8042. The diode circuit 8041 converts alternate current (AC) variations into DC variations 707 and 708. In FIG. 4 (d), the waveform represents an average of the signals in FIG. 4 (c), taken between the second filter 8042 and the comparator 8043. As can be seen, the waveform 709 on the right side of the dash line 802 has larger amplitude than the waveform 710 on the left side of the dash line 802. It is apparent that a reference voltage which can be used in the comparator 8043 to determine if the electric arc occurs can be obtained beforehand during a normal operation without the electric arc. The reference voltage is then preset in the comparator 8043 as an optimum threshold to minimize an error probability of the electric arc detection. Thus, the comparator 8043 can compare the average of the signals with the reference voltage and convert it into a bilevel signal sending to the switch control device to control the at least one switch 400.

In FIGS. 1-2, the electrical contacts 410 and 420 of the at least one switch 400 may be an electrical, an electronic, an electro-mechanical, or a mechanical switch such as one in a solid-state relay, an electronic relay, an electro-mechanical relay, a pair of mechanical contacts, or other bidirectional and unidirectional current control devices such as a triac, a back-to-back thyristor, a silicon-controlled rectifier (SCR), a transistor, a metal-oxide-semiconductor field-effect transistor (MOSFET), a field-effect transistor (FET), a transistor, or various combinations thereof. Also, such devices may be connected with some snubber circuits to maintain their functionality under voltage spikes. Please note that although the LED arrays 214 are used throughout the context, the LED arrays may mean one or more LED arrays.

Whereas preferred embodiments of the present disclosure have been shown and described, it will be realized that alterations, modifications, and improvements may be made thereto without departing from the scope of the following claims. Another kind of the electric arc detection and prevention schemes in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:
    a housing having two ends;
    one or more LED arrays disposed between the two ends of the housing;
    an LED driving circuit;
    two lamp bases respectively connected to the two ends of the housing, each lamp base comprising at least one electrical conductor configured to insert into a respective lamp fixture socket;
    at least one rectifier configured to convert an alternate current (AC) voltage to a direct current (DC) voltage; and
    an electric arc detection and current control circuit comprising a first derivative circuit coupling the DC voltage from the at least one rectifier, a comparator circuit, a switch control device, and at least one switch controlled by the switch control device to connect or disconnect the electric current return from the LED driving circuit and the one or more LED arrays,
    wherein:
        when an electric arc is detected, the electric arc detection and current control circuit disconnects an electric current return from the LED driving circuit and the one or more LED arrays to prevent the electric current return from reaching the at least one rectifier; and
        when the at least one electrical conductor in each lamp base is inserted into the respective lamp fixture socket without the electric arc, the electric arc detection and current control circuit enables the LED driving circuit to drive the one or more LED arrays to light up.

2. The linear LED tube lamp of claim 1, wherein the electric arc detection and current control circuit is configured to receive power from the at least one rectifier.

3. The linear LED tube lamp of claim 1, wherein the first derivative circuit comprises a differentiator configured to couple the DC voltage from the at least one rectifier, to take first derivative of the coupled DC voltage, and to couple to the comparator circuit.

4. The linear LED tube lamp of claim 1, wherein the first derivative circuit further comprises a first filter configured to reduce ripples from the at least one rectifier.

5. The linear LED tube lamp of claim 1, wherein the comparator circuit comprises a comparator configured to covert an analog signal into a bilevel signal.

6. The linear LED tube lamp of claim 5, wherein the comparator is configured to send the bilevel signal to the switch control device, subsequently controlling the at least one switch to switch "on" when the electric arc is not detected or to switch "off" when the electric arc is detected.

7. The linear LED tube lamp of claim 5, wherein the comparator comprises a reference voltage, the reference voltage being preset as a threshold to minimize an error probability of the electric arc detection.

8. The linear LED tube lamp of claim 1, wherein the comparator circuit comprises a diode circuit connecting to the first derivative circuit, configured to rectify signals from the first derivative circuit.

9. The linear LED tube lamp of claim 1, wherein the comparator circuit comprises a second filter configured to average out signals received.

10. The linear LED tube lamp of claim 1, wherein the at least one switch comprises electrical contacts comprising electrical terminals of at least one relay.

11. The linear LED tube lamp of claim 10, wherein the at least one relay comprises a solid-state relay, an electronic relay, an electro-mechanical relay, or a combination thereof.

12. The linear LED tube lamp of claim 1, wherein the at least one switch comprises electrical contacts comprising electrical terminals of at least one triac.

13. The linear LED tube lamp of claim 1, wherein the at least one switch comprises electrical contacts comprising electrical terminals of at least one electronic switch.

14. The linear LED tube lamp of claim 13, wherein the at least one electronic switch comprises a metal-oxide-semiconductor field-effect transistor (MOSFET), a field-effect transistor (FET), a transistor, a back-to-back thyristor, a silicon-controlled rectifier (SCR), or a combination thereof.

* * * * *